(12) United States Patent
Kirol et al.

(10) Patent No.: US 6,427,478 B1
(45) Date of Patent: Aug. 6, 2002

(54) AQUA-AMMONIA ABSORPTION SYSTEM GENERATOR WITH SPLIT VAPOR/LIQUID FEED

(75) Inventors: Lance D. Kirol, Morrisville, VT (US); Paul Sarkisian, Boulder City, NV (US)

(73) Assignee: Rocky Research, Boulder City, NV (US)

( * ) Notice: Subject to any disclaimer, the term of this patent is extended or adjusted under 35 U.S.C. 154(b) by 0 days.

(21) Appl. No.: 09/632,054

(22) Filed: Aug. 3, 2000

(51) Int. Cl.$^7$ ................................................ F25B 15/00
(52) U.S. Cl. ............................... 62/476; 62/101; 62/489
(58) Field of Search .................... 62/476, 481, 484, 62/486, 489, 494, 101

(56) References Cited

U.S. PATENT DOCUMENTS

| 5,367,884 A | 11/1994 | Phillips et al. |
| 5,490,393 A | 2/1996 | Fuesting et al. |
| 5,548,971 A | 8/1996 | Rockenfeller et al. |
| 5,579,652 A | * 12/1996 | Phillips et al. ................. 62/476 |
| 5,916,258 A | * 6/1999 | Cho ............................. 62/476 |
| 6,000,235 A | 12/1999 | Kuhlenschmidt .......... 62/324.2 |

FOREIGN PATENT DOCUMENTS

JP            05187736            7/1993

* cited by examiner

*Primary Examiner*—William Doerrler
*Assistant Examiner*—Melvin Jones
(74) *Attorney, Agent, or Firm*—Knobbe, Martens, Olson & Bear, LLP

(57) ABSTRACT

An aqua-ammonia absorption apparatus comprising an absorber assembly, a generator assembly, a condenser and an evaporator, wherein the absorber assembly comprises an absorber and a GAX absorber heat exchanger and wherein a strong liquor absorption solution is partially vaporized in the GAX absorber heat exchanger to form a two-phase vapor/liquor mixture, the apparatus including piping for directing separate vapor and liquid streams from the absorber assembly into the generator assembly and introducing the vapor stream into the generator assembly at a location where the composition is substantially the same as the vapor stream.

34 Claims, 1 Drawing Sheet

US 6,427,478 B1

AQUA-AMMONIA ABSORPTION SYSTEM GENERATOR WITH SPLIT VAPOR/LIQUID FEED

BACKGROUND OF THE INVENTION

Aqua-ammonia absorption systems incorporate, as the major components, an absorber, generator, condenser, and an evaporator. Such systems, well known in the art, are disclosed, for example, in U.S. Pat. Nos. 5,367,884, 5,548, 971, 5,367,884, and 5,490,393 the descriptions of which, including system components, features and operation, are incorporated herein by reference. These aqua-ammonia absorption systems may be designed and operated as heat pumps, refrigeration equipment, chillers, heating appliances, and chiller-heaters.

The generator of an aqua-ammonia absorption system operates as a distillation column and includes, as components, a boiler, a stripping section or stripper, and a rectifying section. The composition feed to the generator comprising an ammonia rich liquor from the system absorber, is introduced to the generator at one or more feed or inlet points. The boiler is designed to produce liquid and vapor counter-flow coincident with heat input. Prime heat is introduced over a finite length or height of the boiler resulting in significant change in ammonia concentration in the area of heat input. In some systems, the boiler is replaced by a reboiler in which heat is input from a prime energy source but with no substantial ammonia separation other than from vapor separating in equilibrium from the liquid near the bottom of the column. Thus, a reboiler simply returns vapor to the generator column.

The stripping section comprises all sections of the generator column which are below the highest (coldest) feed point. In the stripping section, heat is recovered from solution leaving the bottom of the distillation column with the recovered heat returned to the portion of the column above the boiler. The stripping section comprises three portions: a solution-heated-desorber (SHD) and either an adiabatic desorber or a generator-absorber heat exchange (GAX) desorber, and the boiler. The SHD is that portion of the stripping section which extracts heat from weak solution, i.e., solution from the bottom of the generator column, before the weak solution is routed to the absorber. The adiabatic desorber of the stripping section has no heat input and is typically located between the coldest feed point and the SHD. The GAX desorber receives heat from the absorber, either by heat transfer using weak liquor from the bottom of the generator column or a secondary fluid. Typically, a generator in a GAX aqua-ammonia absorption system will have a GAX desorber or an adiabatic desorber, but not both. When the system utilizes strong liquor GAX an adiabatic section is used, whereas a GAX desorber is used for weak liquor GAX or secondary fluid GAX. An additional component of a generator is a rectifier which is the section of the generator above the highest (coldest) feed point. Such generators as described above are illustrated in the drawings and will be described in further detail hereinafter.

The feed to the generator column from the system absorber is a rich liquor comprising a solution having a comparatively high ammonia content. Such rich liquor typically has 40% to 50% ammonia, but under some operating conditions may be as low as about 20%. Such a rich liquor is contrasted to a weak liquor directed from the generator to the absorber, which comprises a water-rich composition having between about 1% and about 15% ammonia at rating conditions, and typically between about 3% and about 5% ammonia. In conventional strong-liquor GAX absorption cycles, heat is recovered by passing a portion of the strong liquor through a heat exchanger in the GAX absorber, and heating the solution above its bubble point so that it becomes a two phase mixture. The portion of the strong liquor not passed through the GAX heat exchanger is introduced into the generator at or near the bottom of the rectifier as a single-phase liquid at or below the bubble point temperature. The second feed stream to the generator is that portion of the strong liquor which is passed through the GAX absorber. The second feed stream, comprising liquid and vapor, is introduced into the generator at a lower location than the first single-phase liquid feed. Thus conventional strong liquor GAX is not separated into liquid and vapor components, but is introduced into the generator together at a common point.

SUMMARY OF THE INVENTION

A generator of the invention is improved by separating a second feed of the rich strong liquor from the GAX absorber into liquid and vapor portions, and introducing the separate vapor and liquid portions into the generator at different points along the column.

DETAILED DESCRIPTION OF THE PREFERRED EMBODIMENTS

Figure 1:
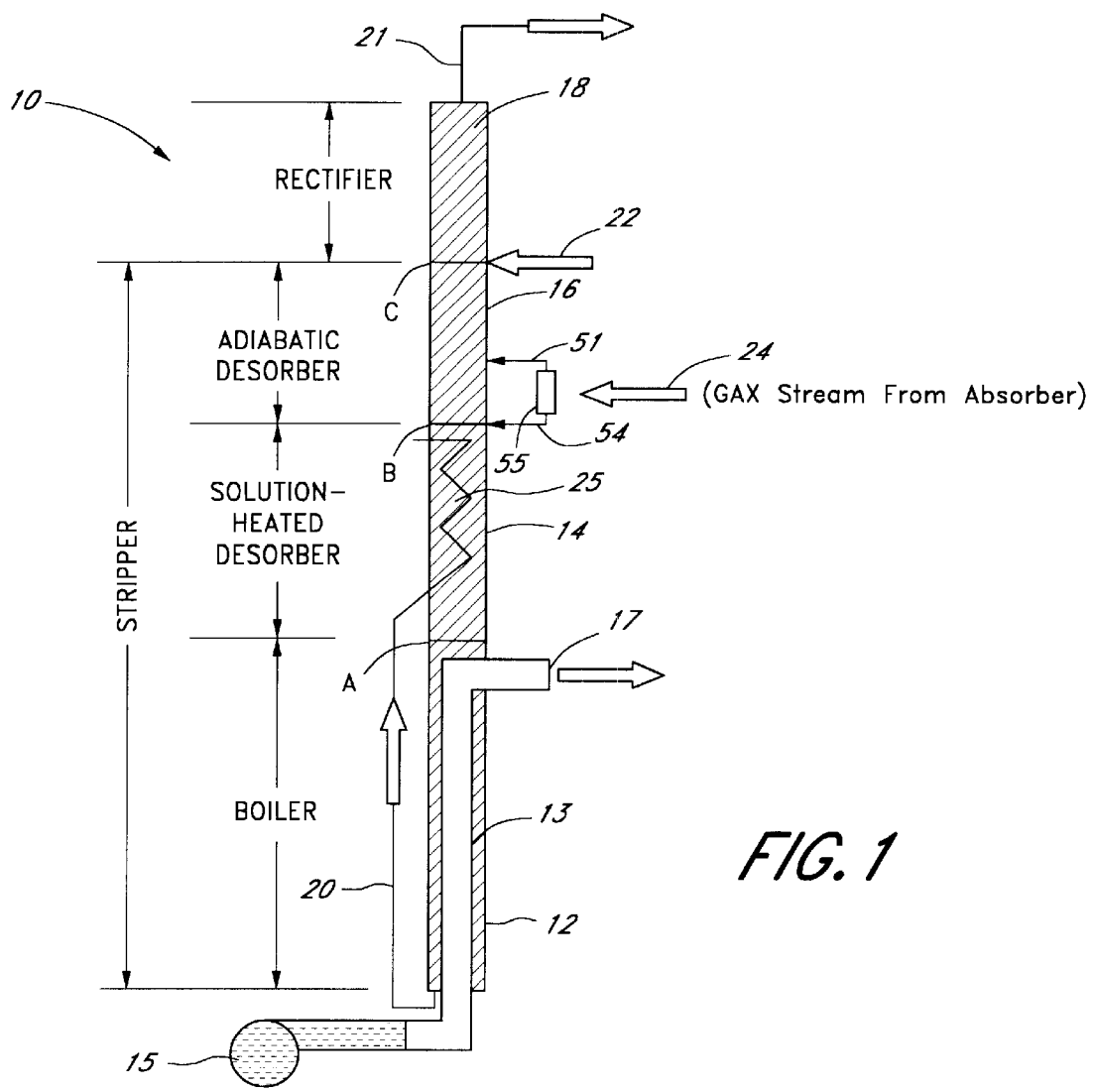
FIG. 1 is a side sectional schematic illustration of an aqua-ammonia generator of the invention having a second feed of rich GAX liquor separated into liquid and vapor streams introduced at different locations along the generator column.

In the embodiment of FIG. 1, generator 10 comprises four different sections within a single shell shown in an upright, vertical position as it is typically oriented and used in an aqua-ammonia absorption apparatus. The stripping section of the generator column is the combined boiler, SHD and adiabatic sections and is located at the hotter section of the generator below level C near the input of the first feed 22. Thus, the stripping section comprises all sections of the generator column below the highest (coldest) feed point while the rectifier is the section of the generator above the highest feed point. The coolest section of the column is rectifier 18, located above level C. Conduit 21 directs a refrigerant vapor from the rectifier to the condenser of the absorption apparatus. At the lower portion of the generator column is a boiler section 12 extending from the lowest end of the column to level A. Above the boiler is SHD section 14 positioned between levels A and B along the column length, position B being at the level that second feed 24 is introduced. Located above SHD section 14 is adiabatic desorber section 16 extending between level B and level C along the column length, level C corresponding to the first feed input 22. At the upper portion of generator 10 is rectifier 18 extending between level C and the upper end of the generator column. Although the generator 10 is illustrated as being a single or common shell made up of the different sections stacked vertically along the shell, the generator may be composed of one or more shells containing different sections.

The boiler section 12 is heated by a burner 15 with a fire tube 13 extending along the length of the boiler section with the exhaust gases from the burner vented at end 17 of the fire tube. The burner provides heat to the boiler from a prime energy source. Heat from the boiler section is directed into the SHD section 14 via piping 20 using weak liquor. The heat exchanger 25 extending along the length of the SHD section 14 delivers sensible heat from the weak liquor.

In the embodiment of the invention illustrated in FIG. 1 two feed streams are introduced at three feed points along the generator column. The first feed stream comprises unGAXed strong liquor introduced into the column at first feed inlet 22 as a single-phase fluid (first liquid feed) at or slightly below the bubble-point temperature of the liquid. The feed is a rich liquor, as previously described, having typically 40% to 50% ammonia directed to feed input 22 from an absorber. This liquid is referred to herein as "unGAXed" liquor since it is the portion of rich liquor that has not passed through the generator heat exchanger in the GAX absorber. The first feed inlet 22 for introducing the first liquid feed is at or adjacent to the upper end of the adiabatic desorber section 16, at level C, at or adjacent to the junction between the rectifier and the adiabatic section. The second feed 24, the GAX stream from the absorber, is separated into a vapor phase stream 51 and a liquid phase stream 54 (the second liquid feed stream) by separator device or apparatus 55. The second feed 24 is the "GAXed" portion of the rich liquor having passed through the generator heat exchanger in the GAX absorber. As the rich liquor passes through the generator heat exchanger it is heated to a temperature above the bubble point of the solution whereby it becomes a two-phase liquid/vapor mixture. The vapor phase stream 51 is introduced into the adiabatic desorber 16 below the first feed inlet 22, and the liquid phase stream 54 of the two-phase mixture is introduced at level B and is distributed at the upper end of the solution heated desorber section 14 at or adjacent to the junction between the adiabatic section and the solution heated desorber section. Such feed separation is provided so that each feed species (vapor and liquid) is introduced at the level of the generator where feed composition and internal composition are most closely matched. Vapor and liquid in the second feed are in equilibrium with each other. Thus, the proper separation distance for injection into the generator column is the height of one theoretical distillation stage. By definition, vapor out of the top of a theoretical stage is in equilibrium with liquid out of the bottom of the stage.

Splitting feed streams as described above improves separation efficiency and overall generator performance. These as well as other advantages of the invention will be evident to those skilled in the art.

What is claimed is:

1. An aqua-ammonia absorption apparatus comprising an absorber assembly, a generator assembly, a condenser and an evaporator, wherein said absorber assembly comprises an absorber and a GAX absorber heat exchanger and wherein a strong liquor absorption solution is partially vaporized in said GAX absorber heat exchanger to form a two-phase vapor/liquid mixture, said apparatus including piping for directing separate vapor and liquid streams from said absorber assembly into said generator assembly said piping introducing the vapor stream into the generator assembly at a location where the internal composition in said generator assembly is substantially the same as said vapor stream introduced therein.

2. Apparatus of claim 1 wherein said generator assembly comprises a reboiler or a boiler section, a solution-heated desorber section, an adiabatic desorber section, and a rectifier section, said piping introducing said vapor stream into said adiabatic desorber section and introducing said liquid stream into said solution-heated desorber section.

3. Apparatus of claim 1 wherein said generator assembly comprises a reboiler or a boiler section, a solution-heated desorber section, an adiabatic desorber section, and a rectifier section, and wherein said piping introduces said vapor stream into said adiabatic desorber section and introduces said liquid stream into said generator assembly at or adjacent to the junction between said adiabatic desorber section and said solution-heated desorber section.

4. Apparatus of claim 1 including a separator device for separating the vapor and liquid phases of the two-phase mixture.

5. Apparatus of claim 1 wherein said generator assembly comprises a solution-heated desorber section, an adiabatic desorber section, and a rectifier section, and wherein said piping introduces said vapor stream into said adiabatic desorber section and introduces said liquid stream into said solution-heated desorber section.

6. Apparatus of claim 1 wherein said generator assembly comprises a solution-heated desorber section, an adiabatic desorber section, and a rectifier section, and wherein said piping introduces said vapor stream into said adiabatic desorber section and introduces said liquid stream into said generator assembly at or adjacent to the junction between said adiabatic desorber section and said solution-heated desorber section.

7. Apparatus of claim 1 wherein said generator assembly comprises a stripping section and a rectifier section, and wherein said piping introduces said vapor stream and said liquid stream into said stripping section.

8. Apparatus of claim 1 wherein the generator assembly comprises one or more shells.

9. Apparatus of claim 2 including a separator device for separating the vapor and liquid phases of the two-phase mixture.

10. Apparatus of claim 2 wherein the generator assembly comprises one or more shells.

11. Apparatus of claim 3 including a separator device for separating the vapor and liquid phases of the two-phase mixture.

12. Apparatus of claim 3 wherein the generator assembly comprises one or more shells.

13. Apparatus of claim 4 wherein said strong liquor absorption solution comprises between about 40% and about 50% ammonia, by weight.

14. Apparatus of claim 4 wherein the generator assembly comprises one or more shells.

15. Apparatus of claim 5 including a separator device for separating the vapor and liquid phases of the two-phase mixture.

16. Apparatus of claim 5 wherein the generator assembly column comprises one or more shells.

17. Apparatus of claim 6 including a separator device for separating the vapor and liquid phases of the two-phase mixture.

18. Apparatus of claim 6 wherein the generator assembly column comprises one or more shells.

19. An aqua-ammonia absorption apparatus comprising an absorber assembly, a generator assembly, a condenser and an evaporator, wherein said absorber assembly comprises an absorber and a GAX absorber heat exchanger and wherein a strong liquor absorption solution is partially vaporized in said GAX absorber heat exchanger to form a two-phase vapor/liquid mixture, said apparatus including first piping for directing a first liquid stream from said absorber assembly and second piping for directing the two-phase vapor/liquid mixture from said absorber assembly into said generator assembly, said first piping introducing the first liquid stream into the generator assembly column at a location where the internal composition within said generator assembly column is substantially the same as said first liquid stream, a separator for separating said two-phase vapor/liquid mixture into a vapor stream and a second liquid stream, said second piping introducing the second liquid stream into the generator assembly column at a location where the internal composition in said column is substantially the same as said second liquid stream introduced therein, and introducing the vapor stream into the generator assembly column at a location where the internal composition in said column is substantially the same as said vapor stream introduced therein.

20. Apparatus of claim 19 wherein said generator assembly comprises a reboiler or a boiler section, a solution-heated desorber section, an adiabatic desorber section, and a rectifier section, and wherein said vapor stream is introduced into said adiabatic section, and said second liquid stream is introduced into said solution-heated desorber section.

21. Apparatus of claim 10 wherein said generator assembly comprises a stripping section and a rectifier section, and wherein said piping introduces said vapor stream and said liquid stream into said stripping section.

22. Apparatus of claim 10 wherein the generator assembly column comprises one or more shells.

23. Apparatus of claim 20 wherein said first liquid stream is introduced along said generator column at or adjacent to the junction between said adiabatic desorber section and said rectifier section.

24. Apparatus of claim 20 wherein the generator assembly column comprises one or more shells.

25. Apparatus of claim 23 wherein the generator assembly column comprises one or more shells.

26. Apparatus of claim 21 wherein the generator assembly column comprises one or more shells.

27. A method of operating an aqua-ammonia absorption apparatus comprising an absorber assembly, a generator assembly, a condenser and an evaporator, wherein said absorber assembly comprises an absorber and a GAX absorber heat exchanger and wherein a strong liquor absorption solution is partially vaporized in said GAX absorber heat exchanger to form a two-phase vapor/liquid mixture, the method comprising directing separate vapor and liquid streams from said absorber assembly into said generator assembly and introducing the vapor stream into the generator assembly at a location where the internal composition in said generator assembly is substantially the same as the vapor stream introduced therein.

28. A method of claim 27 wherein said generator assembly comprises a solution-heated desorber section and an adiabatic desorber section, and wherein said vapor stream is introduced into said adiabatic desorber section and said liquid stream is introduced into said solution-heated desorber section.

29. A method of claim 27 wherein said generator assembly comprises a solution-heated desorber section and an adiabatic desorber section, and wherein said vapor stream is introduced into said adiabatic desorber section and said liquid stream is introduced into said generator assembly at or adjacent to the junction between adiabatic desorber section and said solution-heated desorber section.

30. A method of claim 27 wherein said generator assembly comprises a stripping section, and wherein said vapor stream and said liquid stream are introduced into said stripping section.

31. A method of operating an aqua-ammonia absorption apparatus comprising an absorber assembly, a generator assembly, a condenser and an evaporator, wherein said absorber assembly comprises an absorber and a GAX absorber heat exchanger and wherein a strong liquor absorption solution is partially vaporized in said GAX absorber heat exchanger to form a two-phase vapor/liquid mixture, said apparatus including first piping for directing a first liquid stream from said absorber assembly and second piping for directing the two-phase vapor/liquid mixture from said absorber assembly into said generator assembly, whereby the first liquid stream is introduced into said generator assembly at a first location along said generator column where the internal composition within said column is substantially the same as said first liquid stream, the method comprising separating said two-phase vapor/liquid mixture into a vapor stream and a second liquid stream, and introducing the second liquid stream into the generator assembly column at a location where the internal composition in said column is substantially the same as the second liquid stream introduced therein, and introducing the vapor stream into the generator assembly column at a location where the internal composition in said column is substantially the same as the vapor stream introduced therein.

32. A method of claim 31 wherein the generator assembly comprises a solution-heated desorber section, an adiabatic desorber section, and a rectifier section, and wherein said vapor stream is introduced into said adiabatic section, and said second liquid stream is introduced into said solution-heated desorber section.

33. A method of claim 31 wherein said generator assembly comprises a stripping section and a rectifier section, and wherein said vapor stream and said second liquid stream are introduced into said stripping section.

34. A method of claim 32 wherein said first liquid stream is introduced along said generator column at or adjacent to the junction between the adiabatic desorver section and the rectifier section.

* * * * *